US010400728B2

(12) United States Patent
Heber et al.

(10) Patent No.: US 10,400,728 B2
(45) Date of Patent: Sep. 3, 2019

(54) ELECTROMAGNETICALLY ACTUABLE INTAKE VALVE FOR A HIGH-PRESSURE PUMP, AND HIGH-PRESSURE PUMP

(71) Applicant: Robert Bosch GmbH, Stuttgart (DE)

(72) Inventors: Hans Heber, Stuttgart (DE); Stefan Kolb, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/741,393

(22) PCT Filed: May 9, 2016

(86) PCT No.: PCT/EP2016/060331
§ 371 (c)(1),
(2) Date: Jan. 2, 2018

(87) PCT Pub. No.: WO2017/001095
PCT Pub. Date: Jan. 5, 2017

(65) Prior Publication Data
US 2018/0187638 A1 Jul. 5, 2018

(30) Foreign Application Priority Data
Jul. 2, 2015 (DE) .................. 10 2015 212 376

(51) Int. Cl.
*F02M 37/04* (2006.01)
*F02M 59/46* (2006.01)
(Continued)

(52) U.S. Cl.
CPC ........ *F02M 59/466* (2013.01); *F02M 59/368* (2013.01); *F02M 63/0035* (2013.01);
(Continued)

(58) Field of Classification Search
CPC ............... F02M 59/466; F02M 59/368; F02M 63/0035; F02M 63/0043; F02M 63/0075;
(Continued)

(56) References Cited

U.S. PATENT DOCUMENTS 5,809,950 A * 9/1998 Letsche ..................... F01L 9/02
123/90.12
6,056,264 A * 5/2000 Benson ................ F02M 47/027
251/129.15
(Continued)

FOREIGN PATENT DOCUMENTS

DE 2645594 4/1977
DE 102013220593 4/2015
(Continued)

OTHER PUBLICATIONS

International Search Report for Application No. PCT/EP2016/060331 dated Jun. 28, 2016 (English Translation, 2 pages).

*Primary Examiner* — Hung Q Nguyen
*Assistant Examiner* — Anthony Donald Taylor, Jr.
(74) *Attorney, Agent, or Firm* — Michael Best & Friedrich LLP

(57) ABSTRACT

The invention relates to an electromagnetically actuable intake valve for a high-pressure pump of a fuel injection system, in particular of a common-rail injection system, comprising a reciprocating valve closure element (2) that engages with a valve seat (1) and is loaded in the closing direction by the spring force of a valve spring (3) which is supported on a spring plate (4) connected to the valve closure element (2), further comprising a reciprocating armature (6) that engages with an electromagnet (5) and is loaded in the direction of the valve closure element (2) by the spring force of an armature spring (7) which is larger than that of the valve spring (3). According to the invention, the spring plate (4) has a first abutment face (9) for limiting (Continued)

the opening travel of the valve closure element (2) and a second abutment face (10) for mechanically coupling to the armature (6). The invention also relates to a high-pressure pump having such an intake valve.

13 Claims, 1 Drawing Sheet

(51) Int. Cl.
  *F02M 59/36* (2006.01)
  *F02M 63/00* (2006.01)
  *F16K 31/06* (2006.01)
(52) U.S. Cl.
  CPC .... *F02M 63/0043* (2013.01); *F02M 63/0075* (2013.01); *F16K 31/0655* (2013.01); *F02M 2200/502* (2013.01); *F02M 2200/8061* (2013.01)
(58) Field of Classification Search
  CPC ...... F02M 2200/502; F02M 2200/8061; F16K 31/0655
  USPC ........................................................ 123/495
  See application file for complete search history.

(56) References Cited

U.S. PATENT DOCUMENTS

| | | | | |
|---|---|---|---|---|
| 9,970,399 | B2* | 5/2018 | Marechal | F02M 63/0022 |
| 2009/0301081 | A1* | 12/2009 | Thiery | F02B 37/16 60/602 |
| 2009/0320800 | A1* | 12/2009 | Ricco | F02M 47/027 123/472 |
| 2012/0301340 | A1* | 11/2012 | Aritomi | F02M 59/366 417/505 |
| 2013/0022484 | A1* | 1/2013 | Fuchs | F02D 41/3845 417/490 |
| 2013/0306895 | A1* | 11/2013 | Arikawa | F16K 31/0658 251/129.15 |
| 2014/0034017 | A1* | 2/2014 | Omae | F02M 59/368 123/456 |

FOREIGN PATENT DOCUMENTS

| | | |
|---|---|---|
| EP | 2687713 | 1/2014 |
| WO | 2014057060 | 4/2014 |

\* cited by examiner

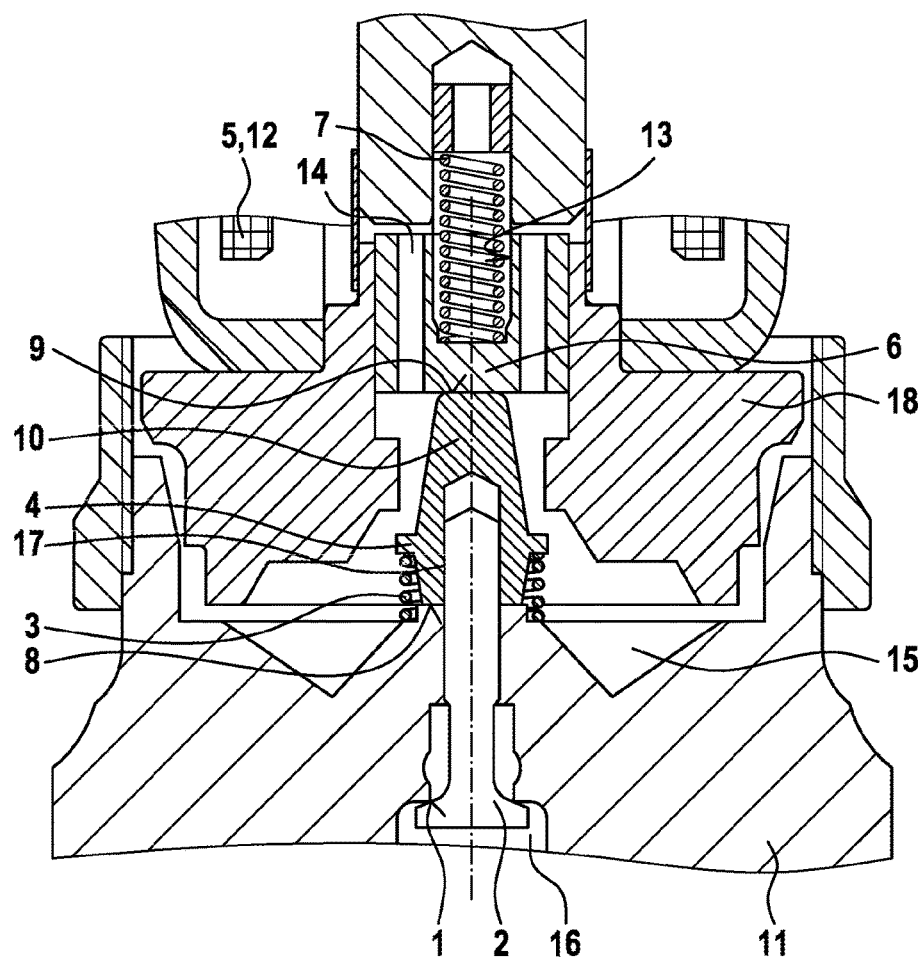

ELECTROMAGNETICALLY ACTUABLE INTAKE VALVE FOR A HIGH-PRESSURE PUMP, AND HIGH-PRESSURE PUMP

BACKGROUND OF THE INVENTION

The invention relates to an electromagnetically actuable intake valve for a high-pressure pump of a fuel injection system, in particular of a common-rail injection system. The invention also relates to a high-pressure pump for a fuel injection system, in particular for a common-rail injection system, having such an intake valve.

An electromagnetically controllable intake valve for a high-pressure pump of a fuel injection system is known from the laid-open specification DE 10 2013 220 593 A1, which valve comprises a plate-like valve body, inserted into a housing part of the high-pressure pump, with an axial bore in which a valve closure element is accommodated so as to be movable in a reciprocating manner. In the closing direction, the valve closure element is loaded by the spring force of a spring which is in the form of a helical compression spring and which is supported both on the valve body and indirectly via a spring plate on the valve closure element. In order to move the valve closure element into an open position counter to the spring force of the spring, a magnet assembly having a magnet coil is also provided. The magnet coil interacts with a reciprocating armature which is loaded in the direction of the valve closure element by the spring force of a further spring whose spring force is larger than that of the first spring, with the result that, when the magnet coil is electrically deenergized, the armature is coupled to the valve closure element via an armature pin and keeps said element in an open position. For the purpose of closure, the magnet coil is electrically energized, with the result that the armature moves in the direction of the magnet coil, that is to say away from the valve closure element. The load relief of the valve closure element, which is brought about in the process, leads to the spring force of the spring which loads the valve closure element in the closing direction transferring the valve closure element into the closed position. In order to open the intake valve again, the energization of the magnet coil is stopped. The spring force of the spring which loads the armature subsequently returns the armature back into its starting position, wherein the armature pin of the armature abuts against the valve closure element and carries this along until the spring plate connected to the valve closure element bears against the valve body and limits the opening stroke of the valve closure element. During the opening, the flow of force thus runs via the armature or the armature pin, the nozzle needle and the spring plate into the valve body. In this case, a radial joining position between the spring plate and the valve closure element is subjected to high loads which can lead to the spring plate and the valve closure element moving relative to one another. This is to be avoided.

SUMMARY OF THE INVENTION

It is therefore the object of the present invention to increase the robustness of an electromagnetically actuable intake valve for a high-pressure pump of a fuel injection system, in particular of a common-rail injection system, in order to prevent relative movements of the spring plate and the valve closure element.

The electromagnetically actuable intake valve proposed for a high-pressure pump of a fuel injection system, in particular of a common-rail injection system, comprises a reciprocating valve closure element which interacts with a valve seat and which is loaded in the closing direction by the spring force of a valve spring which is supported on a spring plate connected to the valve closure element. The intake valve further comprises a reciprocating armature which interacts with an electromagnet and which is loaded in the direction of the valve closure element by the spring force of an armature spring, which spring force is larger than that of the valve spring. According to the invention, the spring plate has a first abutment surface for limiting the opening stroke of the valve closure element and has a second abutment surface for mechanically coupling to the armature. This means that the armature abuts no longer directly or, via an armature pin, indirectly against the valve closure element but against the spring plate connected to the valve closure element. In this case, the abutment force of the armature is introduced directly into the spring plate, with the valve closure element being bypassed. This leads to the radial joining position between the spring plate and the valve closure element being relieved of load. As a result, the demands on the robustness of the joining position are lower, or the robustness of the intake valve increases. Owing to the lower demands on the joining position, the costs may also be optimized, since no complex connecting technique by welding or calking is required to produce a permanent connection between the spring plate and the valve closure element.

For the formation of the second abutment surface, the spring plate preferably has a section which projects beyond the valve closure element in the axial direction. This ensures that, during its resetting movement, the armature does not come into contact with the valve closure member. That section of the spring plate which projects beyond the valve closure element may for this purpose be of sleeve-like or cap-like form and surround or—in the case of a cap-like design—completely enclose that end of the valve closure element which faces toward the armature.

In the case of the known intake valve described at the beginning, the spring plate is designed as a sleeve which surrounds an end section of the valve closure element, wherein, however, the valve closure element projects beyond the spring plate in order to allow the required mechanical coupling to the armature or to the armature pin. By contrast, the spring plate of the intake valve according to the invention has a significantly larger dimension in the axial direction. The term "spring plate" is retained, however, in order to refer to the original and still existing function of this component which is to support the valve spring. For this purpose, a collar section which extends radially outward is preferably provided on the spring plate.

The spring plate is advantageously of sleeve-like form at least in sections and placed on that end of the valve closure element which faces away from the valve seat. The sleeve-shaped form facilitates the establishment of a permanent connection of spring plate and valve closure element, which connection is preferably a pressing connection. Such a connection can be established in a simple and low-cost manner and, in view of the lower demands on the robustness of the joining position, ensures a sufficiently load-bearing connection.

It is furthermore preferable for the first abutment surface to be an annular end face of the spring plate. The end face is that end face of the spring plate which faces away from the armature. The annular form of the first abutment surface leads to a uniform force distribution if the spring plate itself abuts against a valve body or a housing part of the high-pressure pump in order to limit the opening stroke of the valve closure element.

According to a first preferred embodiment of the invention, the first abutment surface of the spring plate interacts in a stroke-limiting manner with a valve plate, forming the valve seat, of the intake valve. The valve plate is preferably inserted into a housing part of the high-pressure pump and furthermore is preferably prestressed axially with respect to the housing part via a valve screw. In this case, the abutment force of the armature is introduced via the spring plate firstly into the valve plate and then into the housing part of the high-pressure pump.

According to an alternative embodiment of the invention, the first abutment surface of the spring plate interacts in a stroke-limiting manner with a housing part, forming the valve seat, of the high-pressure pump. This means that the intake valve is integrated without a valve plate of its own into the housing part of the high-pressure pump. The abutment force of the armature is in this case transmitted via the spring plate directly into the housing part of the high-pressure pump. The omission of the valve plate reduces the number of the components and, in this way, lowers the production costs.

It is furthermore proposed that the armature is in the form of a solenoid plunger and is surrounded, at least regionally, by an annular magnet coil of the electromagnet. In this way, large armature strokes are achievable.

A central recess for accommodating and supporting the armature spring is advantageously formed in the armature. The armature spring is guided and fixed in place inside the recess. Furthermore, it is ensured that the armature is loaded centrally by the spring force of the armature spring.

In order to allow pressure equalization in the armature movement space during a stroke movement of the armature, there is preferably formed in the armature at least one throughflow opening which extends from one end face to the other end face of the armature. During a stroke movement of the armature, fuel is able to flow from a region of the armature movement space situated above the armature through the throughflow opening in the armature into a region situated below the armature, such that pressure equalization is brought about. Preferably, there are provided multiple decentrally arranged throughflow openings, which are arranged at an equal angular spacing with respect to one another so that the armature is flowed through uniformly.

Furthermore, a high-pressure pump for a fuel injection system, in particular for a common-rail injection system, having an intake valve according to the invention is proposed. Here, the intake valve is preferably integrated into a housing part, forming the valve seat, of the high-pressure pump. The formation of the valve seat by the housing part of the high-pressure pump leads to the omission of a separate valve plate. The number of components is thus reduced, and this leads to further cost optimization.

BRIEF DESCRIPTION OF THE DRAWING

A preferred embodiment of the invention will be explained in more detail below on the basis of the appended drawing.

The single drawing FIGURE shows a schematic longitudinal section through an electromagnetically actuable intake valve according to the invention, which is integrated into a high-pressure pump for a fuel injection system.

DETAILED DESCRIPTION

The intake valve illustrated schematically in the FIGURE is integrated into a housing part 11 of a fuel high-pressure pump. The housing part 11 forms a valve seat 1 of the intake valve. At the same time, guidance of a reciprocating valve closure element 2 of the intake valve is brought about, said element interacting with the valve seat 1 in a sealing manner. In the closing direction, the valve closure element 2 is loaded by the spring force of a valve spring 3 which surrounds that end of the valve closure element 2 which faces away from the valve seat 1. The valve spring 3 is supported both on the housing part 11 and on a spring plate 4 which is pressed onto and completely encloses the end of the valve closure element 2.

In the FIGURE, the intake valve is illustrated in the open position. The opening stroke of the valve closure element 2 is in this case limited by the spring plate 4 which for this purpose has an abutment surface 8 which is formed by the annular end face of the spring plate 4 which faces toward the housing part 11. In the open position of the intake valve, the abutment surface 8 bears against the housing part 11 of the high-pressure pump. The spring force of the valve spring 3 acting in the closing direction is in this case exceeded by the spring force of an armature spring 7 which loads an armature 6 in the direction of the spring plate 4. The spring force of the armature spring 7, which spring is accommodated in a central recess 13 of the armature 6, is for this purpose selected to be larger than that of the valve spring 3. Here, the armature 6 bears against a section 10, projecting beyond the valve closure element 2, of the spring plate 4.

For the purpose of closing the intake valve, there is provided an electromagnet 5 which comprises an annular magnet coil 12. If the magnet coil is electrically energized, a magnetic field builds up, the magnetic force of which moves the armature 6 upward counter to the spring force of the armature spring 7. The armature 6 detaches from the spring plate 4 in the process, with the result that the spring force of the valve spring 3 pulls the valve closure element 2 into the valve seat 1. The spring plate 4 lifts off from the housing part 11 in the process. Throughflow openings 14, which are provided in the armature 6 and are arranged decentrally, bring about pressure equalization.

For the purpose of opening the intake valve, the electrical energization of the magnet coil 12 is stopped. The spring force of the armature spring 7 subsequently returns the armature 6 back into its starting position. In the process, the armature 6 abuts against an abutment surface 9 of the spring plate 4, which surface is formed by an end face, facing toward the armature 6, of the section 10 of the spring plate 4. The abutment force of the armature 6 is diverted via the spring plate 4 into the housing part 11 as soon as said plate bears against the housing part 11. Since the spring plate 4 is pressed onto the end of the valve closure element 2, the valve closure element 2 is lifted out of the valve seat 1 via the movement of the spring plate 4, and the intake valve opens. Fuel is then able to flow via a low-pressure space 15, which is delimited by the housing part 11 and a valve body 18, via the valve seat 1 into a high-pressure element space 16 of the high-pressure pump.

In the case of the intake valve according to the invention which is represented, the mechanical coupling of the armature 6 to the valve closure element 2, which is required to open the intake valve, is brought about indirectly via the spring plate 4. Said plate has for this purpose the section 10, projecting beyond the valve closure element 2, with the abutment surface 9. The core of the invention is thus a modified spring plate 4. The modified spring plate 4 causes a radial joining position 17 in the region of the press fit of the spring plate 4 on the valve closure element 2 to be relieved of load, and the robustness of the intake valve increases.

The invention is not restricted to the embodiment of an integrated intake valve illustrated in the FIGURE, but also includes intake valves which have a valve plate for forming the valve seat 1.

The invention claimed is:

1. An electromagnetically actuable intake valve for a high-pressure pump of a fuel injection system, comprising:
   a reciprocating valve closure element (2) which interacts with a valve seat (1) and which is loaded in a closing direction of the valve closure element (2) by a spring force of a valve spring (3) which is supported on a spring plate (4) connected to the valve closure element (2); and
   a reciprocating armature (6) which interacts with an electromagnet (5) and which is loaded in an opening direction of the valve closure element (2) by a spring force of an armature spring (7), wherein the spring force of the armature spring (7) is larger than the spring force of the valve spring (3), and wherein the spring plate (4) has a first abutment surface (8) for limiting an opening stroke of the valve closure element (2) and a second abutment surface (9) for contacting the armature (6), such that the spring plate (4) is defined by a section (10) which projects beyond the valve closure element (2) in an axial direction so as to form the second abutment surface (9).

2. The intake valve as claimed in claim 1, wherein the spring plate (4) is of sleeve-like form at least in sections and is placed on an end of the valve closure element (2).

3. The intake valve as claimed in claim 1, wherein the first abutment surface (8) is an annular end face of the spring plate (4).

4. The intake valve as claimed in claim 1, wherein the armature (6) is in the form of a solenoid plunger and is surrounded, at least regionally, by an annular magnet coil (12) of the electromagnet (5).

5. The intake valve as claimed in claim 1, wherein a central recess (13) for accommodating and supporting the armature spring (7) is formed in the armature (6).

6. The intake valve as claimed in claim 1, wherein at least one throughflow opening (14) is formed in the armature (6).

7. A high-pressure pump for a fuel injection system, the high-pressure pump comprising:
   a housing part (11) forming the valve seat (1), wherein the intake valve of claim 1 is integrated into the housing part (11) of the high-pressure pump.

8. The intake valve as claimed in claim 1, wherein the spring plate (4) is of sleeve-like form at least in sections and is pressed on an end of the valve closure element (2).

9. The intake valve as claimed in claim 1, wherein the first abutment surface (8) interacts in a stroke-limiting manner with a housing part (11), the housing part (11) forming the valve seat (1).

10. The intake valve as claimed in claim 1, wherein at least one throughflow opening (14), which is arranged decentrally, is formed in the armature (6).

11. The intake valve as claimed in claim 1, wherein the valve closure element (2) does not extend into the armature (6).

12. The intake valve as claimed in claim 1, wherein the armature (6) includes a central abutment surface that contacts the second abutment surface (9) of the spring plate (4).

13. An electromagnetically actuable intake valve for a high-pressure pump of a fuel injection system, comprising:
   a reciprocating valve closure element (2) which interacts with a valve seat (1) and which is loaded in a closing direction of the valve closure element (2) by a spring force of a valve spring (3) which is supported on a spring plate (4) connected to the valve closure element (2); and
   a reciprocating armature (6) which interacts with an electromagnet (5) and which is loaded in an opening direction of the valve closure element (2) by a spring force of an armature spring (7), wherein the spring force of the armature spring (7) is larger than the spring force of the valve spring (3), and wherein the spring plate (4) has a first abutment surface (8) for contacting a housing part (11) of the high-pressure pump and a second abutment surface (9) for contacting the armature (6), such that the spring plate (4) is defined by a section (10) which projects beyond the valve closure element (2) in an axial direction so as to form the second abutment surface (9).

* * * * *